US 12,259,265 B1

(12) United States Patent
Aiken

(10) Patent No.: US 12,259,265 B1
(45) Date of Patent: *Mar. 25, 2025

(54) APPARATUS AND METHOD FOR STORING, MEASURING AND DISPENSING SEMI-SOLID FOOD SUBSTANCES

(71) Applicant: John Edward Aiken, Monroeville, PA (US)

(72) Inventor: John Edward Aiken, Monroeville, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/902,650

(22) Filed: Sep. 30, 2024

Related U.S. Application Data

(63) Continuation-in-part of application No. 18/599,441, filed on Mar. 8, 2024, now Pat. No. 12,129,103.

(51) Int. Cl.
| | |
|---|---|
| *G01F 19/00* | (2006.01) |
| *B65D 21/08* | (2006.01) |
| *B65D 85/74* | (2006.01) |
| *B65D 85/78* | (2006.01) |

(52) U.S. Cl.
CPC ......... *G01F 19/005* (2013.01); *B65D 21/086* (2013.01); *B65D 85/74* (2013.01); *B65D 85/78* (2013.01)

(58) Field of Classification Search
CPC ..... G01F 19/005; B65D 21/086; B65D 85/74; B65D 85/78
See application file for complete search history.

(56) References Cited

U.S. PATENT DOCUMENTS

| | | | | |
|---|---|---|---|---|
| 2,256,865 | A * | 9/1941 | Gilbert | G01F 19/005 73/429 |
| 2,373,026 | A * | 4/1945 | Guyer | G01N 9/02 73/32 R |
| 2,839,928 | A * | 6/1958 | Fohrman | G01F 19/005 D10/46.2 |
| 4,981,041 | A | 1/1991 | Merkle | |
| 6,026,685 | A * | 2/2000 | Weterrings | G01F 19/00 220/8 |
| 6,575,336 | B1 * | 6/2003 | Bayer | B65D 23/12 116/323 |

(Continued)

FOREIGN PATENT DOCUMENTS

| | | | | |
|---|---|---|---|---|
| CN | 104417931 | A | * | 3/2015 |
| CN | 206019768 | U | * | 3/2017 |

(Continued)

*Primary Examiner* — Bob Zadeh

(57) ABSTRACT

The present invention provides an adjustable height apparatus for storing, measuring and dispensing a desired quantity of semi-solid food, the apparatus being assembled on a piston base with peripheral contact inside a rigid circular sleeve configured for storing at least 600 cubic centimeters of a semi-solid food substance above the piston base inside the rigid circular cylinder. Preferably, the rigid circular sleeve is transparent. After filling, the apparatus is configured to enable pushing a measured food material out the top of the cylinder. A graduated bar is slidingly engaged in the outer surface of the circular sleeve such that markings on it can be aligned with the top of the piston base. Pushing down on the circular sleeve enables the desired quantity only to be above the top rim of the cylinder.

9 Claims, 4 Drawing Sheets

(56) References Cited

U.S. PATENT DOCUMENTS

| | | | | |
|---|---|---|---|---|
| 6,655,555 | B1 * | 12/2003 | Yankoglu | ............. B01F 31/441 |
| | | | | 222/243 |
| 11,142,372 | B2 | 10/2021 | Ho | |
| 12,129,103 | B1 * | 10/2024 | Aiken | ................ B65D 83/0005 |
| 2002/0097953 | A1 | 5/2002 | Judith | |
| 2018/0086543 | A1 * | 3/2018 | Van Why | ........... B65D 83/0005 |

FOREIGN PATENT DOCUMENTS

| | | | | |
|---|---|---|---|---|
| CN | 218120816 | U | * 12/2022 | |
| CN | 116081117 | A | * 5/2023 | |
| DE | 3429763 | A | * 3/1985 | ............. B05C 17/01 |

* cited by examiner

APPARATUS AND METHOD FOR STORING, MEASURING AND DISPENSING SEMI-SOLID FOOD SUBSTANCES

FIELD OF THE INVENTION

The present invention relates, in general, to food storage and measuring, and, more particularly, this invention relates to an apparatus for storing, measuring and dispensing many semi-solid food substances.

CROSS REFERENCE TO RELATED APPLICATION

This patent application is a continuation in part of U.S. Utility Patent Application Ser. No. 18/599,441 filed Mar. 8, 2024, which is related to and claims priority from U.S. Provisional Patent Application Serial Number 63/450,854 filed Mar. 8, 2023.

PRIOR ART

There is on the market a food measuring cylinder of limited capacity with no lid. When being filled, it is tall and narrow and prone to tipping over. Also, it needs to be filled and cleaned for each use. In U.S. Pat. No. 6,026,685, Weterrings et al recognized some of these shortcomings and offered instead telescopic cylinders with a larger and elliptical cross section. However, Wetterrings elliptical shape rules out the most secure lid attachment, threaded parts. Obviously, Wetterrings is teaching away from storage, and the volume to be dispensed is set before the food material is added. Merkle in U.S. Pat. No. 4,981,041 discloses a measuring and dispensing device for semi-solid materials such as shortening. Merkle teaches a tubular body open at both ends and a plunger about the same length and fitting tightly inside the tubular body. After the tubular body is filled with the semi-solid material, the plunger is pushed down to the graduated mark for the volume desired. There are no provisions for storing material in the device and it must be filled and cleaned afterward for each use. In US Patent Application Publication 2002/0097953, Judith discloses an adjustable measuring device having an outer tubular member and a piston-like member entirely inside the outer member such that it can be pushed upward along a number of measuring stop along the inside wall of the outer tubular member. The user must remember or write down the starting and ending measurement points, thus creating the potential for error. Also, there are no provisions for storing. Ho in U.S. Pat. No. 11,142,372 discloses a telescopic container with a lid, but there is no capability for measuring. Also, the lid of Ho does not allow the stored substance to be even with the top rim, thus rendering it less adaptable to measurement.

BACKGROUND OF THE INVENTION

Prior to the conception and development of the present invention, most semi-solid cooking ingredients such as peanut butter and shortening have been measured with a standard measuring cup by spooning from its storage container. This creates difficulty getting all the material out of the measuring cup and also a difficult-to-clean mess. Thus, there is also some wastage of the desired material left in both the container and the measuring cup. Devices on the market or otherwise disclosed are limited to a single dispensing for each filling. In spite of a substantial amount of prior art, there has been until now a long-standing need for an apparatus that can store a substantial quantity of semi-solid food substances with essentially no air space above and reliably dispense multiple quantities of the food substance before needing to be refilled. This will render the apparatus useful for ice cream also to eliminate frost on top, so the apparatus is designed to be placed in a freezer or refrigerator after dispensing a portion of the ingredient.

SUMMARY OF THE INVENTION

The present invention provides a circular cylindrical container with a resealable lid configured for storing at least 600 cubic centimeters (cc) (about 18 ounces) of a semi-solid food material within a transparent cylindrical sleeve slidingly engaged over a piston base. An adjustable graduated measuring bar is movable along the exterior wall of a cylindrical sleeve to set the start and stop points for the selected quantity to be dispensed. Upon user pushing downward on the sleeve, the piston pushes the food material out the top of the cylinder sleeve until the desired quantity is pushed above the top rim of the sleeve. That material can then be sliced off into a mixing bowl at the rim level and the lid reinstalled at the top rim.

OBJECTS OF THE INVENTION

It is, therefore, one of the primary objects of the present invention to provide a food ingredient storage container for at least 18 ounces of semi-solid food substance with built-in dispensing capability for a desired quantity.

Another object of the present invention is to provide a storage device for semi-solid ingredients with an adjustable measurement capability that does not need cleaned every time it dispenses the measured quantity.

Still another object of the present invention is to provide an apparatus that results in less wastage of semi-solid food material.

Yet another object of the present invention is to store food material with essentially no air space above before and after dispensing.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures.

Figure 1:
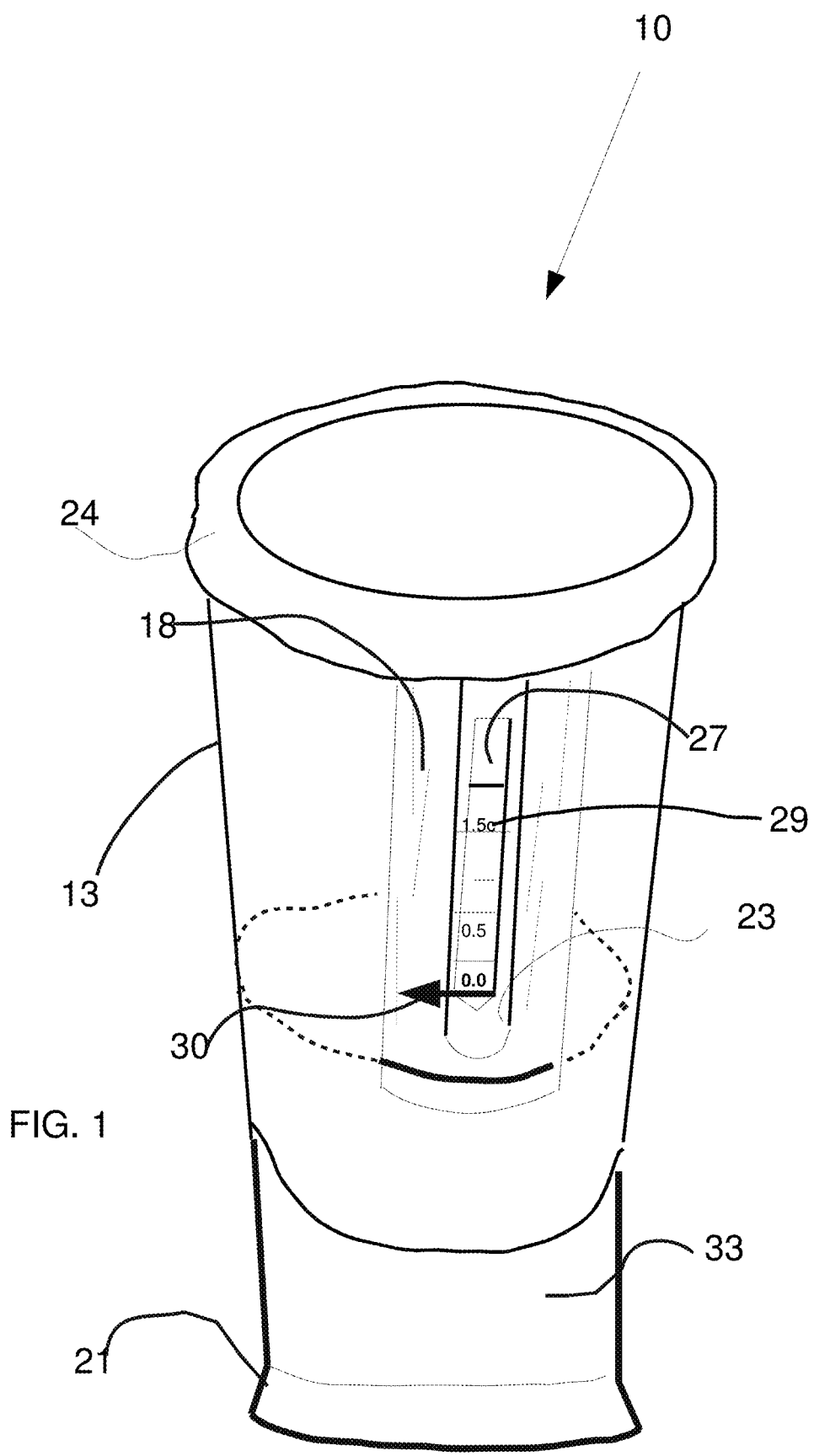
FIG. 1 provides a perspective view of the now preferred embodiment of the present apparatus.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, very similar components which have identical functions have been identified with identical reference numerals throughout the several views illustrated in the drawing figures.

Referring initially to FIG. 1, this provides a perspective view of the now preferred embodiment of the present apparatus 10 having a circular telescopic piston-in-sleeve apparatus with an adjustable external measuring device which includes a graduated bar 2. In this embodiment, the piston member 33 is hollow and has an optional flared base 21. This adds to standing stability and facilitates pressing the outer storage sleeve 13 downward to dispense stored food material 30. To enable essentially all of the stored material to eventually be pushed out the top of the storage sleeve 13, the straight-side length of the piston 99 should be nearly the same as the storage space depth 97. The lid can be screwed on utilizing the threads 38 proximal to the top rim 34 of the outer storage sleeve.

Figure 2:
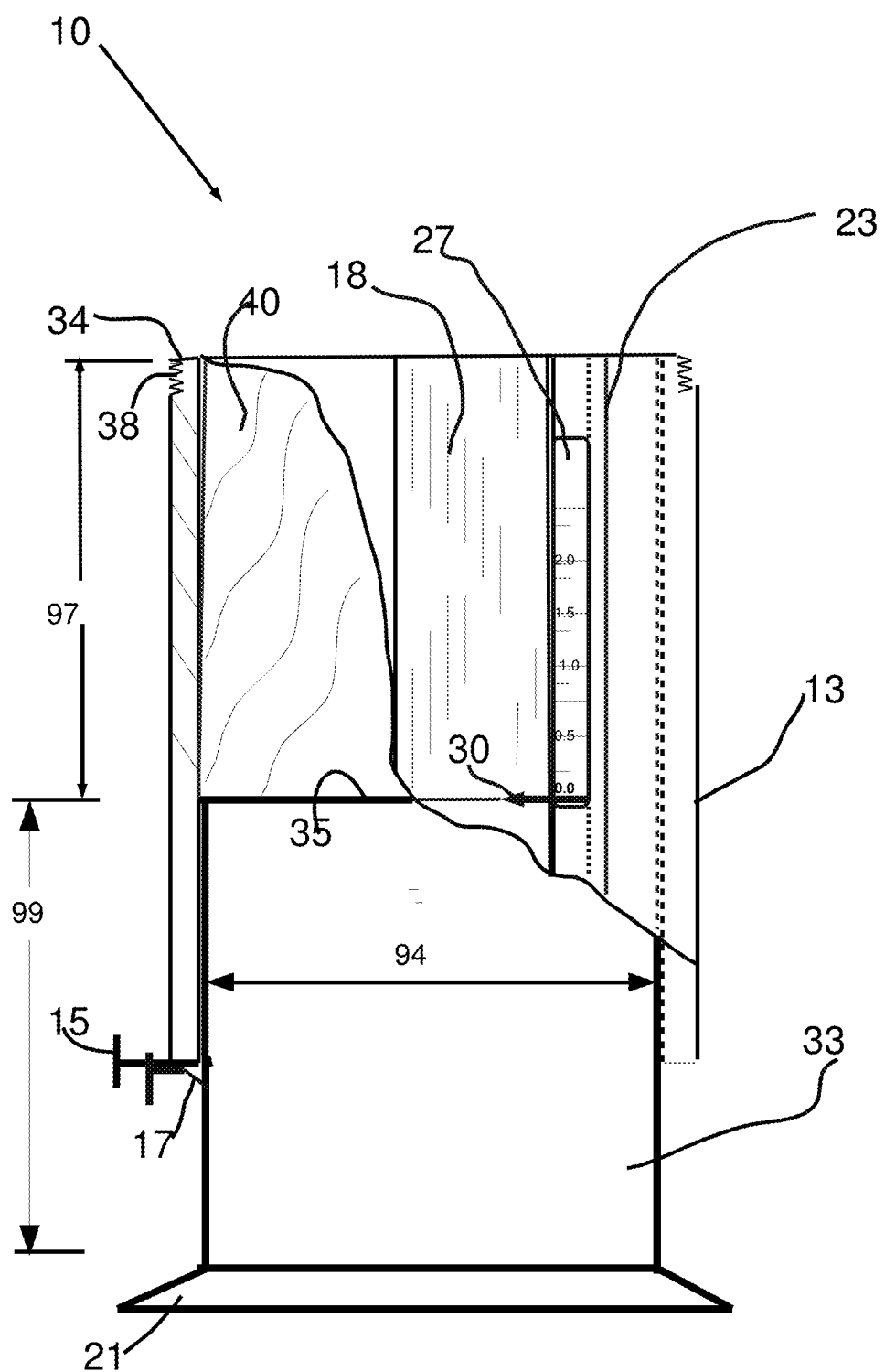
FIG. 2 is a partial sectional elevation view of the present invention.

FIG. 2 is a sectional elevation view of an alternative embodiment of the present invention 10 illustrating a condition just prior to measuring the desired quantity. The rigid cylinder 12 has at least a transparent window 18 in a portion of the wall of the rigid cylinder 13. The storage sleeve 13 is a rigid cylinder with an inside diameter marginally larger than the outside diameter 94 of the piston member 33. The diameter 94 and depth 97 combined create a volume significant enough to hold up to a 24-ounce jar of peanut butter or other semi-solid material. If the diameter is too large, it will sometimes be difficult to remove the food substance that has been pushed up. If it is too narrow, the apparatus may tip over easily when fully extended. Thus, a suitable range for the diameter 94 is between 7 and 11 centimeters (cm), and thus for a desirable volume, the height 99 should be in the range of 8 to 12 cm. A releasable anti-slip device 17 is attached to the bottom rim of the storage sleeve 13. It can be temporarily released to permit the bottom rim of the storage sleeve 13 to be pushed as far as all the way to the flared base 21.

Figure 3:
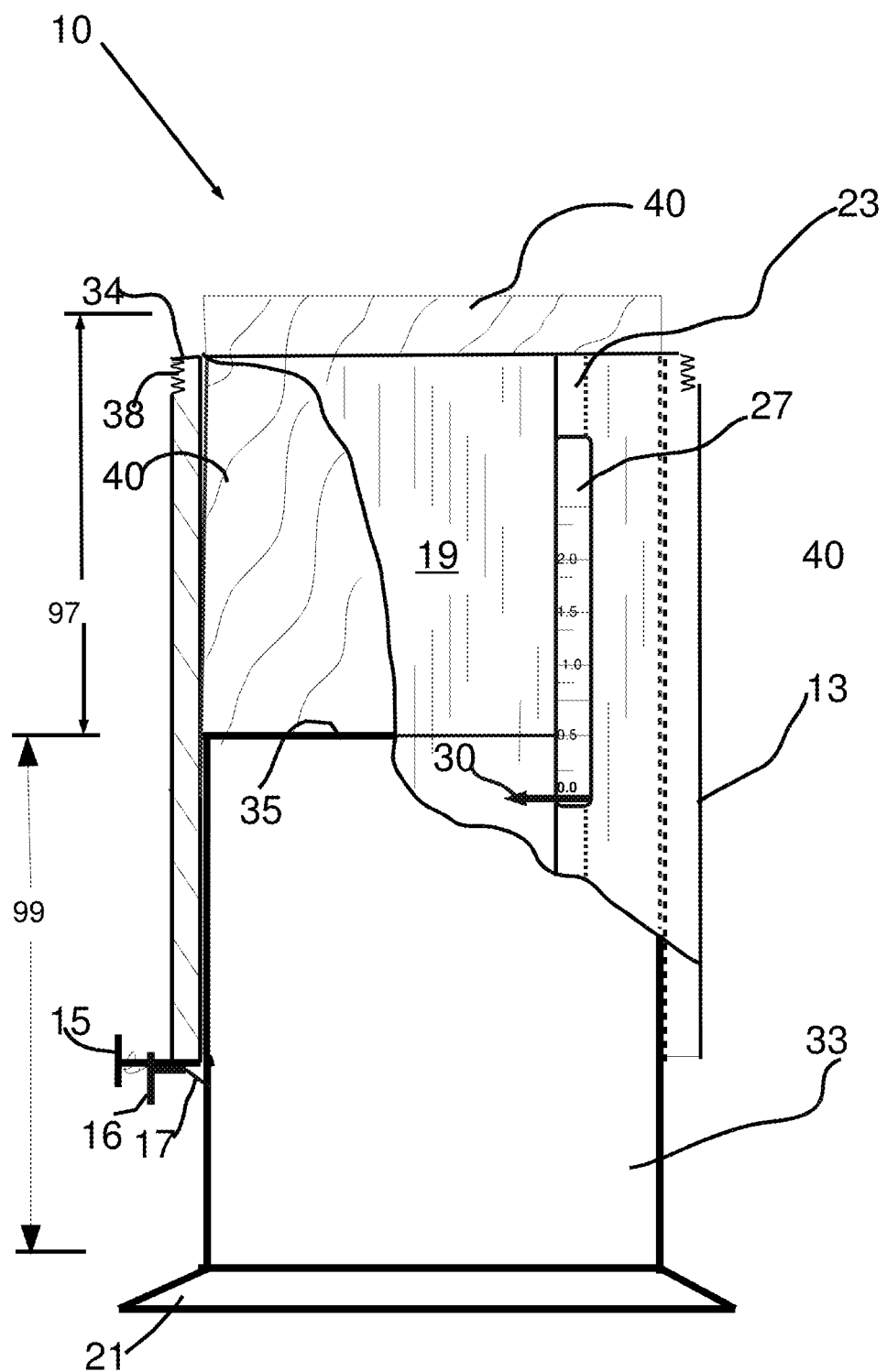
FIG. 3 is a partial sectional view of an alternative embodiment of the present invention in a deployment example.

FIG. 3 is a partial sectional view of an alternative embodiment of the present invention in a deployment example. This embodiment is very similar to the first except that the entire storage sleeve 13 is a transparent material 19. However, shown here is an example with a measured amount of food substance 40 pushed above the upper rim 34. The zero arrow 30 on the graduated bar 27 had previously been located even with the top surface 35 of the piston 33. There are numerous known methods for allowing the graduated bar 27 to be manually moved but remain in that position, typically via friction. One simple way is for the graduated bar 27 to fit tightly into a shallow channel in the wall of the storage sleeve 13. If necessary, the storage sleeve 13 can be restrained from slipping down once positioned with the aid of a friction pad or blade 17 on the bottom rim pushed against the piston member by a spring between tabs 15 and 16. This friction pad can be released temporarily by squeezing the tabs 15 and 16 closer to one another compressing a spring. This is just one example of how slippage of the storage sleeve could be retarded.

Figure 4:
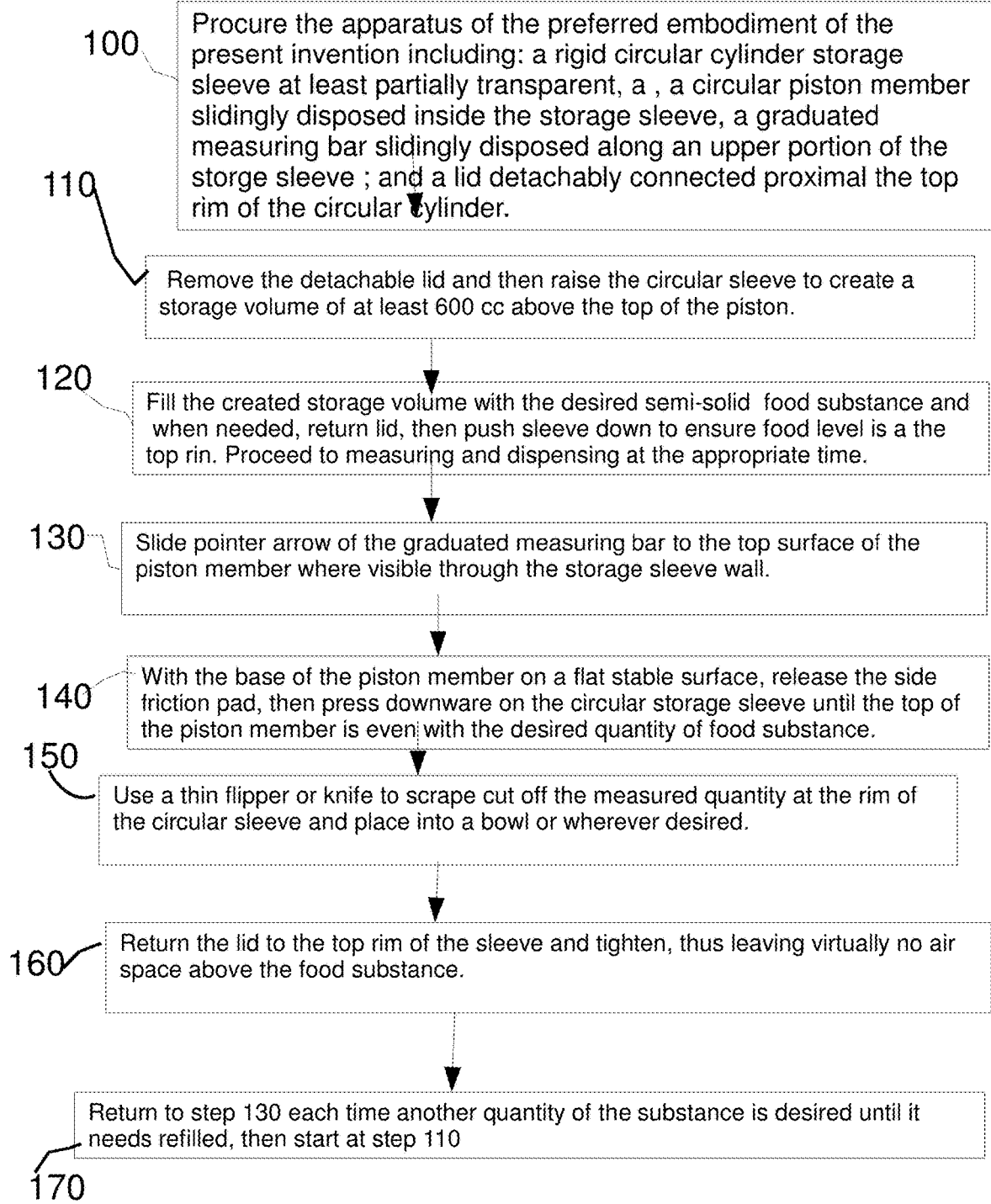
FIG. 4 is a flow diagram for the method of the present invention using a preferred apparatus of the invention.

FIG. 4 is a flow diagram for a method of dispensing a select volume of food substance with the present invention starting with procuring the preferred apparatus of the invention in Step 100. With the piston member lowered and lid off, the storage sleeve is filled with a substantial quantity of a selected semi-solid food substance, Steps 110 and 120. At step 130, slide the graduated bar until the zero arrow is pointing to the top surface of the piston where it is visible through the wall of the storage sleeve. Take note of the measurement line on the graduated bar that corresponds to the quantity desired, for instance 0.5 cups or 120 milliliters. With the piston base on a flat surface, pull and hold the side tabs together, then push the storage sleeve down until the top of the piston aligns with the desired measurement line—step 140. Release the tabs and allow the spring to push the friction pad back against the piston. At step 150, a thin spatula, flipper, or knife is slid along the upper rim and across to remove the desired amount of food substance. It may be helpful to spray the underside of the utensil with an oil spray to prevent sticking. At step 160, the lid is returned and there should be virtually no air space above the food substance. This would be especially favorable for storing the bottom portion of an ice cream container to avoid frost formation and maintain flavor. Several dispensings should be obtained before refilling is necessary. With ice cream for certain, the apparatus with remaining food would be returned to a freezer. Other substances could be kept in a refrigerator if desired.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from the spirit of the invention or the claims herein.

I claim:

1. An apparatus for storing and dispensing variable measured amounts of semi-solid food substances comprising:
  a) a rigid circular piston having an upper portion with a preselected outside diameter and a predetermined height;
  b) a rigid-wall sleeve open at both ends and having an inside diameter such that the rigid-wall sleeve is in sliding contact with the periphery of the circular piston, and wherein at least a portion of the rigid-wall sleeve is transparent;
  c) an elongated graduated measuring bar slidingly engaged outside an upper wall portion adjacent the at least a transparent portion of an outer wall of the rigid-wall cylinder, the measuring bar having a line or arrow denoting the zero mark; and
  d) a lid detachably covering an end of the rigid-wall sleeve at an upper rim.

2. The apparatus of claim 1 wherein the lid and rigid-wall sleeve have mating threads adjacent the upper rim of the rigid-wall sleeve.

3. The apparatus of claim 1 wherein the at least transparent portion of the rigid-wall sleeve is all of the rigid-wall sleeve.

4. The apparatus of claim 1 wherein the preselected outside diameter is between 7 and 11 cm.

5. The apparatus of claim 1 wherein the predetermined height is between 8 and 12 centimeters.

6. The apparatus of claim 1 wherein the rigid-wall sleeve further includes a releasable device for restricting slippage of the rigid-wall sleeve.

7. The apparatus of claim 1 wherein the circular piston further has a flared base.

8. A method for measuring, and dispensing a portion of semi-solid food substance stored in an apparatus, the steps including:
  i) procuring the specific apparatus comprising a) a rigid circular piston having an upper portion with a first outside diameter and a predetermined height, the rigid circular piston further having a flared base; b) a rigid-wall sleeve open at both ends and having an inside diameter such that the rigid-wall sleeve is in sliding contact with the periphery of the rigid circular piston, and wherein at least a portion of the rigid-wall sleeve is transparent; and have a releasable device for retarding slippage c) an elongated graduated measuring bar slidingly engaged to an outer wall of the rigid-wall cylinder adjacent the transparent wall portion, the measuring bar having a zero pointer at one end, and typical food volume marks along the length above the zero pointer; and d) a lid detachably covering an end of the rigid-wall cylinder at an upper rim;

ii) Removing the detachable lid, then raising the rigid-wall sleeve above the circular piston sufficiently to create a storage volume of at least 600 cc between the piston top surface and the upper rim;

iii) Filling the storage volume with a volume semi-solid food substance up to the upper rim of the;

iv) Replacing the detachable lid or proceeding to measuring a desired portion of semi-solid food substance;

v) Sliding the graduated measuring bar until the zero pointer is even with a visible top surface of the circular piston, then;

vi) With the base of the rigid circular piston on a flat stable surface, release any device for retarding slippage then press down on the circular sleeve until the top surface of the piston is even with a mark corresponding to the desired portion of semi-solid food substance;

vii) Using a thin flipper or knife scrape or cut off the measured portion at the upper rim of the circular sleeve and place into one of a bowl or container; and, viii) Returning the lid to the upper rim of the sleeve and tightening, thus leaving no air space above the food substance.

9. The method of claim 8 wherein the apparatus containing food substance is placed in one of a refrigerator or freezer until the next usage.

* * * * *